US006413639B1

(12) United States Patent
Kobayashi et al.

(10) Patent No.: US 6,413,639 B1
(45) Date of Patent: Jul. 2, 2002

(54) MG-AL BASED HYDROTALCITE-TYPE PARTICLES, CHLORINE-CONTAINING RESIN STABILIZER AND PROCESS FOR PRODUCING THE PARTICLES

(75) Inventors: Naoya Kobayashi, Hiroshima; Torayuki Honmyo, Otake; Tsutomu Katamoto, Hatsukaichi; Akinori Yamamoto, Hatsukaichi, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 145 days.

(21) Appl. No.: 09/632,942

(22) Filed: Aug. 4, 2000

(30) Foreign Application Priority Data

Oct. 1, 1999 (JP) ............................................. 11-281987

(51) Int. Cl.$^7$ ................................................. B32B 5/16
(52) U.S. Cl. ........................ 428/403; 427/220; 427/221; 427/242; 428/407
(58) Field of Search .................................. 428/403, 407; 427/220, 221, 242

(56) References Cited

U.S. PATENT DOCUMENTS 5,416,141 A  5/1995  Endres et al. ................ 524/109

FOREIGN PATENT DOCUMENTS

| EP | 0 558 758 A1 | 9/1993 |
| GB | 2 075 989 | 11/1981 |
| WO | WO 92/20732 | 11/1992 |

*Primary Examiner*—Hoa T. Le
(74) *Attorney, Agent, or Firm*—Nixon & Vanderhye

(57) ABSTRACT

The Mg—Al-based hydrotalcite-type particles according to the present invention have a plate surface diameter as large as from 0.1 to less than 1.0 μm, an adequate thickness ranging from 0.02 to 0.08 μm and a heat-resisting time of not less than 160 minutes when measured by a specific method, and are, therefore, suitable as a stabilizer for chlorine-containing resins.

11 Claims, 1 Drawing Sheet

MG-AL BASED HYDROTALCITE-TYPE PARTICLES, CHLORINE-CONTAINING RESIN STABILIZER AND PROCESS FOR PRODUCING THE PARTICLES

BACKGROUND OF THE INVENTION

The present invention relates to Mg—Al-based hydrotalcite-type particles, a chlorine-containing resin stabilizer, and a process for producing the Mg—Al-based hydrotalcite-type particles. More particularly, the present invention relates to Mg—Al-based hydrotalcite-type particles having a large plate surface diameter and an adequate thickness which are suitable as a stabilizer for chlorine-containing resins; the chlorine-containing resin stabilizer; and a process for producing such Mg—Al-based hydrotalcite-type particles.

As layered compounds, there are known various compounds as well as clay minerals or the like. Among these layered compounds, layered double hydroxides such as hydrotalcite have such a structure capable of inserting various ions or molecules into spacings between respective layers thereof and, therefore, can exhibit an anion-exchanging property.

In general, as described in Journal of the Chemical Society of Japan, 1995, No. 8, pp. 622 to 628, the hydrotalcite is represented by the formula:

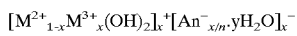

$$[M^{2+}_{1-x}M^{3+}_x(OH)_2]_x^+[An^-_{x/n}\cdot yH_2O]_x^-$$

(wherein $M^{2+}$ is a divalent metal ion such as $Mg^{2+}$, $Co^{2+}$, $Ni^{2+}$ or $Zn^{2+}$; $M^{3+}$ is a trivalent metal ion such as $Al^{3+}$, $Fe^{3+}$ or $Cr^{3+}$; $An^-$ is an n-valent anion such as $OH^-$, $Cl^-$, $CO_3^{2-}$ or $SO_4^{2-}$; and x is usually 0.2 to 0.33,) and such hydrotalcite has a laminated crystal structure which comprises two-dimensional main layers composed of regular octahedral brucite units each having a positive charge, and interlayers each having a negative charge.

The hydrotalcite has been used in various applications because of good anion-exchanging property thereof, for example, as ion exchange materials, adsorbents, deodorants or the like. Also, the hydrotalcite has been used in various other applications such as stabilizers for resins or rubbers, e.g., polyethylene, polypropylene and chlorine-containing resins (typically, vinyl chloride resins), as well as paints, various catalysts, agricultural films, inks or the like.

In particular, as gasket materials the chlorine-containing resins have been widely used because the chlorine-containing resins are more excellent in flexibility and adhesion property than those of rubbers, thermoplastic elastomers or the like.

However, the chlorine-containing resins are susceptible to heat deterioration and oxidation degradation and, therefore, suffer from deteriorated properties such as low elongation when used for a long period of time, thereby causing such a problem that the resins are no longer usable as gasket materials.

In recent years, as to catalysts or the like, it has also been required to use those containing no harmful metals from the standpoint of environmental protection. The hydrotalcite-type particles have been expected to satisfy these requirements because the hydrotalcite-type particles have almost no toxicity and exhibit an excellent catalytic property or the like.

In particular, among the hydrotalcite-type particles, Mg—Al-based hydrotalcite-type particles containing $Mg^{2+}$ as a divalent metal ion and $Al^{3+}$ as a trivalent metal ion, are most noticeable owing to its good stability. There have also been known iron-based hydrotalcite-type particles (Japanese Patent Application Laid-Open (KOKAI) No. 9-227127 (1997)). However, when the iron-based hydrotalcite-type particles are kneaded with resins, the obtained kneaded material is disadvantageously colored due to inclusion of the iron. Further, when used as a stabilizer for chlorine-containing resins, the iron-based hydrotalcite-type particles cannot exhibit a sufficient heat resistance as compared to the Mg—Al-based hydrotalcite-type particles.

As the general production method of hydrotalcite, there is known a method of mixing an aqueous metal salt solution containing divalent metal ions and trivalent metal ions which constitute main layers thereof, with an aqueous carbonate solution containing carbonate ions which constitute interlayers thereof, and then subjecting the obtained mixture to coprecipitation reaction while controlling the temperature, the pH value and the like (Eiichi NARITA, "Chemistry of Layered Double Hydroxides as a Fixing Agent of Anions" in "Surface Techniques", pages 722–727, 1993). In addition to the above method of conducting the reaction under ordinary pressure, there is also known a method of producing hydrotalcite under pressure by hydrothermal reaction using an autoclave.

Hitherto, hydrotalcite-type particles to be kneaded into resins, have been required to possess a large plate surface diameter and an adequate thickness in the consideration of dispersibility in resins upon kneading. For example, it has been required to provide such hydrotalcite-type particles having a plate surface diameter of 0.2 to 1 $\mu$m and a thickness of 0.05 to 0.2 $\mu$m. However, the hydrotalcite-type particles obtained by the coprecipitation reaction have a plate surface diameter as small as 0.05 to 0.25 $\mu$m and a thickness of 0.05 to 0.2 $\mu$m. Therefore, in order to obtain hydrotalcite-type particles having a large plate surface diameter, it is necessary to use specific reaction conditions such as hydrothermal synthesis or the like.

Further, in the case where the hydrotalcite-type particles are used as a stabilizer for chlorine-containing resins or rubbers such as vinyl chloride resins or the like, it is required that the particles are not only sufficiently dispersed in the resins or rubbers to obtain resin or rubber products having an excellent heat resistance, but also have a higher chlorine ion-capturing ability.

In addition, as non- or low-toxic lead-free stabilizers for chlorine-containing resins, carboxylate, for example, zinc stearate are used as an essential component. However, when such carboxylates added as a stabilizer captures a chlorine gas released from the chlorine-containing resins, zinc chloride is produced by the reaction therebetween. As is known to those skilled in the arts, the thus produced zinc chloride acts as a decomposition catalyst for the chlorine-containing resins, so that carbon-carbon bonds constituting a skeleton of the resins are broken continuously, resulting in undesirable carbonization of the resins (so-called zinc burning). Accordingly, when used as a stabilizer for the chlorine-containing resins, the hydrotalcite-type particles are required to have a high ability of preventing the zinc burning.

At the present time, it has been strongly demanded to provide Mg—Al-based hydrotalcite-type particles which have a large plate surface diameter, an adequate thickness and a high zinc burning-preventing ability, and is suitable as a stabilizer for chlorine-containing resins. However, such Mg—Al-based hydrotalcite-type particles capable of satisfying the above properties have not been obtained yet.

Specifically, in the conventional coprecipitation method, it is not possible to obtain hydrotalcite-type particles having a large plate surface diameter. Under specific reaction conditions such as hydrothermal synthesis using the autoclave, it is possible to produce hydrotalcite-type particles having a large plate surface diameter. However, when the thus produced hydrotalcite-type particles are use as a stabilizer of chlorine-containing resins, the obtained chlorine-containing resin composition cannot show a sufficient heat resistance.

In particular, the chlorine-containing resin Compositions used as gasket materials are required to have an excellent heat stability and an adequate hardness. Especially, in the case of white or light-colored gasket materials, it is necessary that these materials are free from discoloration due to heat upon processing, i.e., have a good tinting property. As a stabilizer for such chlorine-containing resins satisfying these requirements, the hydrotalcite-type particles are required to exhibit a large plate surface diameter, an adequate thickness and a higher chlorine ion-capturing ability.

Further, the chlorine-containing resin compositions used as gasket materials contain a large amount of a plasticizer (for example, 50 to 100 parts by weight based on 100 parts by weight of the chlorine-containing resin) and, therefore, are soft materials, whereby the resin compositions tend to be foamed upon processing. In consequence, the foaming of the resin compositions should be avoided. In particular, due to the fact that the hydrotalcite-type particles are hydrous compounds, it is difficult to incorporate a large amount of the hydrotalcite-type particles into the resin compositions. Therefore, it has been strongly required to provide hydrotalcite-type particles capable of exhibiting an excellent effect even when added to resins in a small amount.

As a result of the present inventors' earnest studies, it has been found that by mixing an aqueous anion-containing alkali solution, an aqueous magnesium salt solution and an aqueous aluminum salt solution with each other; after controlling a pH value of the solution to a specific range, aging the mixed solution at a specific temperature, thereby producing primary particles; then adding specific amounts of an aqueous magnesium salt solution and an aqueous aluminum salt solution to an aqueous suspension containing the primary particles; aging the aqueous suspension at a specific temperature and a specific pH value, thereby obtaining core particles; and forming on the surfaces of the obtained Mg—Al-based hydrotalcite-type core particles, a coating layer comprising at least one compound selected from the group consisting of higher fatty acids, organosilane compounds and rosins, the thus obtained Mg—Al-based hydrotalcite-type particles can exhibit a large plate surface diameter, an adequate thickness and a high zinc burning-preventing ability, and is suitable as a stabilizer for chlorine-containing resins. The present invention has been attained on the basis of this finding.

SUMMARY OF THE INVENTION

It is an object of the present invention to provide Mg—Al-based hydrotalcite-type particles which have a large plate surface diameter, an adequate thickness and a high zinc burning-preventing ability, and are suitable as a stabilizer for chlorine-containing resins.

It is another object of the present invention to provide a process for producing Mg—Al-based hydrotalcite-type particles which have a large plate surface diameter, an adequate thickness and a high zinc burning-preventing ability, and are suitable as a stabilizer for chlorine-containing resins.

It is a further object of the present invention to provide a chlorine-containing resin stabilizer capable of imparting an excellent stability and heat resistance to the resins.

To accomplish the aim, in a first aspect of the present invention, there are provided Mg—Al-based hydrotalcite-type particles, comprising:

(a) Mg—Al-based hydrotalcite-type core particles represented by the composition formula:

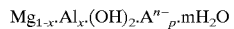

$Mg_{1-x} \cdot Al_x \cdot (OH)_2 \cdot A^{n-}{}_p \cdot mH_2O$ wherein $0.2 \leq x \leq 0.6$; $p = x/n$; A is an n-valent anion; and m is more than 0 and not more than 1, and (b) a coating layer formed on each Mg—Al-based hydrotalcite-type core particle, which comprises at least one compound selected from the group consisting of higher fatty acids, organosilane compounds and rosins; and having:

(c) a plate surface diameter of from 0.3 to less than 1.0 μm, (d) a thickness of from 0.02 to 0.08 μm, (e) a heat-resisting time of not less than 160 minutes when measured by the following methods (1) to (2):

(1) after the hydrotalcite-type particles together with additives are mixed in a vinyl chloride resin at the following mixing ratio, 50 g of the obtained mixture is kneaded at 155° C. for 3 minutes using hot rolls whose gap is set to 0.75 mm, thereby obtaining a kneaded sheet.

Composition of Mixture:

| | |
|---|---|
| Hydrotalcite-type particles | 2 parts by weight |
| Vinyl chloride resin | 100 parts by weight |
| (degree of polymerization: 1,300, tradename: TK-1300, produced by Shin-Etsu Kagaku Kogyo Co., Ltd.) | |
| Diethylhexyl phthalate | 50 parts by weight |
| (DOP, produced by Dai-Hachi Kagaku Co., Ltd.) | |
| Zinc stearate (extra pure reagent) | 0.8 part by weight |

(2) The obtained kneaded sheet is subjected to heat stability test according to JIS K 6723 to measure the heat-resisting time.

In a second aspect of the present invention, there is provided a stabilizer for chlorine-containing resins, comprising the Mg—Al-based hydrotalcite-type particles, comprising:

(a) Mg—Al-based hydrotalcite-type core particles represented by the composition formula:

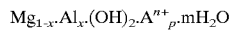

$Mg_{1-x} \cdot Al_x \cdot (OH)_2 \cdot A^{n+}{}_p \cdot mH_2O$ wherein $0.2 \leq x \leq 0.6$; $p = x/n$; A is an n-valent anion; and m is more than 0 and not more than 1, and (b) a coating layer formed on each Mg—Al-based hydrotalcite-type core particle, which comprises at least one compound selected from the group consisting of higher fatty acids, organosilane compounds and rosins; and having:

(c) a plate surface diameter of from 0.3 to less than 1.0 μm, (d) a thickness of from 0.02 to 0.08 μm, (e) a heat-resisting time of not less than 160 minutes when measured by the following methods (1) to (2):

(1) after the hydrotalcite-type particles together with additives are mixed in a vinyl chloride resin at the following mixing ratio, 50 g of the obtained mixture is kneaded at 155° C. for 3 minutes using hot rolls whose gap is set to 0.75 mm, thereby obtaining a kneaded sheet.

Composition of Mixture:

| | |
|---|---|
| Hydrotalcite-type particles | 2 parts by weight |
| Vinyl chloride resin (degree of polymerization: 1,300, tradename: TK-1300, produced by Shin-Etsu Kagaku Kogyo Co., Ltd.) | 100 parts by weight |
| Diethylhexyl phthalate (DOP, produced by Dai-Hachi Kagaku Co., Ltd.) | 50 parts by weight |
| Zinc stearate (extra pure reagent) | 0.8 part by weight |

(2) The obtained kneaded sheet is subjected to heat stability test according to JIS K 6723 to measure the heat-resisting time.

In a third aspect of the present invention, there is provided a process for producing the Mg—Al-based hydrotalcite-type particles as defined in the first aspect, comprising:

mixing an aqueous anion-containing alkali solution, an aqueous magnesium salt solution and an aqueous aluminum salt solution with each other;

after controlling the pH value of the solution to 10 to 14, aging the obtained mixed solution at a temperature of 80 to 105° C. to produce primary particles of the Mg—Al-based hydrotalcite-type core particles;

adding an aqueous magnesium salt solution and an aqueous aluminum salt solution respectively containing magnesium and aluminum in such amounts that the molar ratio of a sum of Mg and Al added in this step to the sum of Mg and Al previously added upon formation of the primary particles is not more than 0.35:1, to the obtained aqueous suspension containing the primary particles;

aging the aqueous suspension at a temperature of 60 to 105° C. while controlling the pH value thereof to 10 to 14; and forming a coating layer comprising at least one compound selected from the group consisting of higher fatty acids, organosilane compounds and rosins, on the surfaces of the obtained Mg—Al-based hydrotalcite-type core particles.

DETAILED DESCRIPTION OF THE INVENTION

Figure 1:
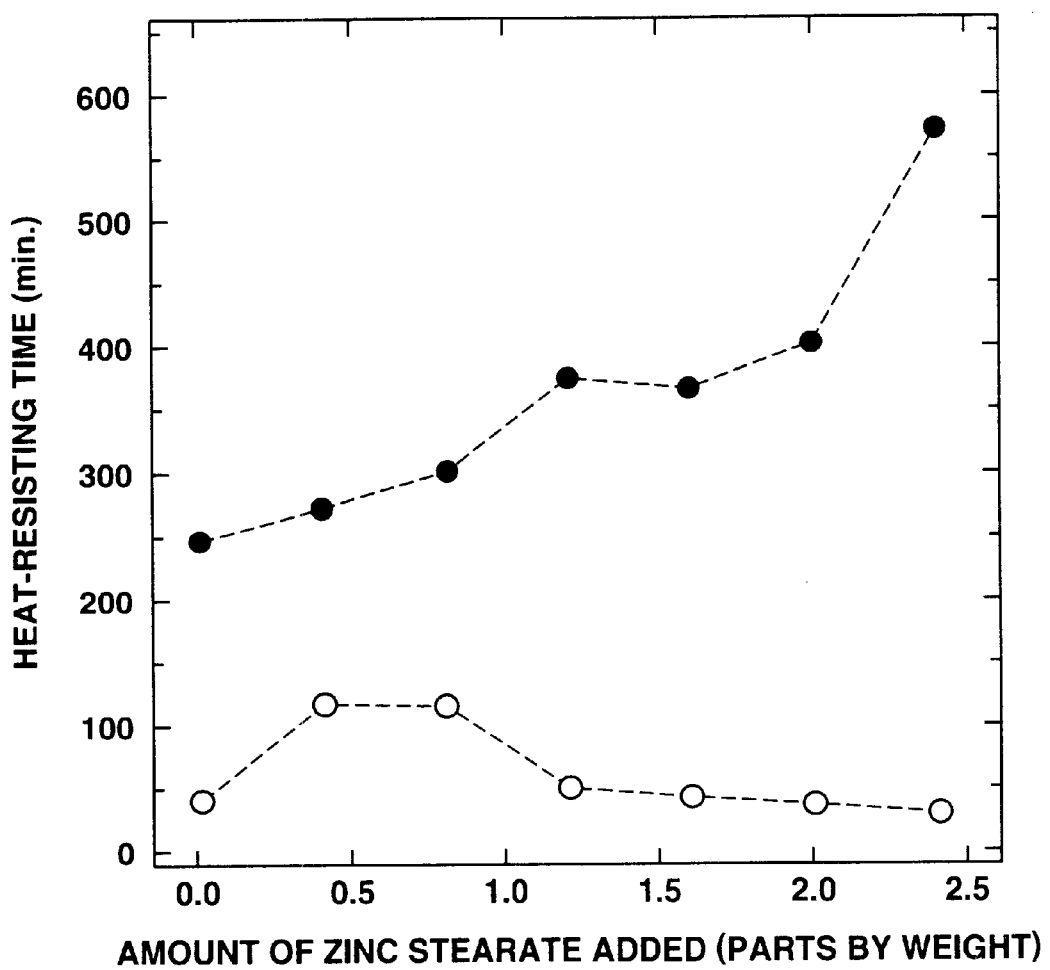
FIG. 1 is a graph showing a relationship between amount of zinc stearate added to a vinyl chloride-kneaded sheet and a heat-resisting time in which plots marked by "·" represent the measuring results of a kneaded sheet using hydrotalcite-type particles obtained in Example 2, and plots marked by "○" represent the measuring results of a kneaded sheet using hydrotalcite-type particles obtained in Comparative Example 6.

The present invention is described in detail below.

First, Mg—Al-based hydrotalcite-type particles according to the present invention are explained.

The Mg—Al-based hydrotalcite-type particles according to the present invention are of a plate-like shape, and have a plate surface diameter of usually from 0.3 to less than 1.0 μm, preferably from 0.3 to 0.8 μm, and a thickness of usually from 0.02 to 0.08 μm, preferably from 0.025 to 0.075 μm.

When the plate surface diameter of the Mg—Al-based hydrotalcite-type particles is less than 0.3 μm, the particles have an insufficient dispersibility in resins when kneaded thereinto. On the other hand, it is difficult to industrially produce such Mg—Al-based hydrotalcite-type particles having the plate surface diameter is not less than 1.0 μm.

When the thickness of the Mg—Al-based hydrotalcite-type particles is less than 0.02 μm, the particles have an insufficient dispersibility in resins when kneaded thereinto. On the other hand, it is difficult to industrially produce such Mg—Al-based hydrotalcite-type particles having the thickness is more than 0.08 μm.

The plate ratio (plate surface diameter/thickness) of the Mg—Al-based hydrotalcite-type particles according to the present invention is usually 2:1 to 15:1, more preferably 2:1 to 13:1; and the BET specific surface area value thereof is usually 7 to 30 m²/g, preferably 7 to 25 m²/g.

The coated Mg—Al-based hydrotalcite-type particles according to the present invention have a pH value of usually 7.5 to 9.5, preferably 7.5 to 9.0. The pH value of the Mg—Al-based hydrotalcite-type particles having the coating layer on the surfaces thereof is lower than that of uncoated Mg—Al-based hydrotalcite-type particles, i.e., that of the core particles.

The Mg—Al-based hydrotalcite-type core particles used in the present invention, have a composition represented by the formula:

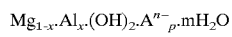

$$Mg_{1-x} \cdot Al_x \cdot (OH)_2 \cdot A^{n-}{}_p \cdot mH_2O$$

wherein $0.2 \leq x \leq 0.6$; $p = x/n$; A is an n-valent anion; and m is more than 0 and not more than 1.

The Al content (x) of the Mg—Al-based hydrotalcite-type core particles used in the present invention, is usually 0.2 to 0.6, preferably 0.2 to 0.56. When the Al content (x) is less than 0.2 (Mg:Al=4:1) or more than 0.6 (Mg:Al=2:3), it is difficult to obtain hydrotalcite-type particles having a single phase.

The anion ($A^{n-}$) contained in the Mg—Al-based hydrotalcite-type core particles used in the present invention may be usually a hydroxy ion ($OH^-$), a carbonate ion ($CO_3^{2-}$), a sulfate ion ($SO_4^{2-}$) or the like. Among these anions, the carbonate ion is preferred.

The plate ratio (plate surface diameter/thickness) of the Mg—Al-based hydrotalcite-type core particles used in the present invention is usually 2:1 to 15:1, more preferably 2:1 to 13:1; and the BET specific surface area value thereof is usually 7 to 30 m²/g, preferably 7 to 25 m²/g; and the pH value thereof is usually 8.0 to 10.0, preferably 8.0 to 9.5.

On the surface of each the Mg—Al-based hydrotalcite-type core particles used in the present invention, is formed a coating layer comprising at least one compound selected from the group consisting of higher fatty acids having 12 to 18 carbon atoms, organosilane compounds and rosins. When the surface-coated Mg—Al-based hydrotalcite-type particles according to the present invention are used as a stabilizer for chlorine-containing resins, the particles can be uniformly dispersed in the chlorine-containing resins, and can exhibit an enhanced chlorine ion-capturing ability, thereby improving a stability and a heat resistance of the obtained resin composition.

The amount of the higher fatty acid coated on the surfaces of the Mg—Al-based hydrotalcite-type core particles used in the present invention is usually 0.2 to 20.0% by weight, preferably 0.5 to 18.0% by weight (calculated as C) based on the weight of the Mg—Al-based hydrotalcite-type core particles. When the coating amount of the higher fatty acids is less than 0.2% by weight, a sufficient coating effect of the higher fatty acids may not be obtained. When the coating amount of the higher fatty acids is more than 20.0% by weight, the coating effect of the higher fatty acids is already saturated and, therefore, it is meaningless to use such a large coating amount of the higher fatty acids.

Examples of the higher fatty acids acids having 12 to 18 carbon atoms may include stearic acid, lauric acid, oleic acid or the like. Among these higher fatty acids, stearic acid and lauric acid are preferred.

The amount of the organosilane compounds coated on the surfaces of the Mg—Al-based hydrotalcite-type core particles is usually 0.2 to 18.0% by weight, preferably 0.4 to 16.5% by weight (calculated as C) based on the weight of the Mg—Al-based hydrotalcite-type core particles. When the coating amount of the organosilane compounds is less than 0.2% by weight, a sufficient coating effect of the organosilane compounds may not be obtained. When the coating amount of the organosilane compounds is more than 18.0% by weight, the coating effect of the organosilane compounds is already saturated and, therefore, it is meaningless to use such a large coating amount of the organosilane compounds.

Examples of the organosilane compounds may include decyltrimethoxysilane, γ-aminopropyltriethoxysilane, γ-aminopropyltrimethoxysilane or the like. Among these organosilane compounds, decyltrimethoxysilane and γ-aminopropyltriethoxysilane are preferred.

The amount of the rosins coated on the surfaces of the Mg—Al-based hydrotalcite-type core particles is usually 0.2 to 25.0% by weight, preferably 0.5 to 20.0% by weight (calculated as C) based on the weight of the Mg—Al-based hydrotalcite-type particles as core particles. When the coating amount of the rosins is less than 0.2% by weight, a sufficient coating effect of the rosins may not be obtained. When the coating amount of the rosins is more than 25.0% by weight, the coating effect of the rosins is already saturated and, therefore, it is meaningless to use such a large coating amount of the rosins.

As the rosins, there may be exemplified water-soluble rosins, natural rosins, hydrogenated rosins or the like. Specific examples of the rosins may include "SIZEPAIN E-50" and "KE-6o4" (produced by Arakawa Kagaku Co., Ltd.), "GUM ROSIN" and "TALL ROSIN" (produced by Harima Kasei Co., Ltd.) or the like.

The kneaded sheet prepared by the following method using the Mg—Al-based hydrotalcite-type particles according to the present invention, has a heat-resisting time of usually not less than 160 minutes, preferably 170 to 550 minutes when measured by heat stability test according to JIS K 6723.

Production Method of Kneaded Sheet:

After the hydrotalcite-type particles together with additives are mixed in a vinyl chloride resin at the following mixing ratio, 50 g of the obtained resin mixture is kneaded at 155° C. for 3 minutes using hot rolls whose gap is set to 0.75 mm, thereby obtaining a kneaded sheet.

Composition of Mixture:

| | |
|---|---|
| Hydrotalcite-type particles | 2 parts by weight |
| Vinyl chloride resin (degree of polymerization: 1,300, tradename: TK-1300, produced by Shin-Etsu Kagaku Kogyo Co., Ltd.) | 100 parts by weight |
| Diethylhexyl phthalate (DOP, produced by Dai-Hachi Kagaku Co., Ltd.) | 50 parts by weight |
| Zinc stearate (extra pure reagent) | 0.8 part by weight |

When the heat-resisting time is less than 160 minutes, a chlorine-containing resin containing the Mg—Al-based hydrotalcite-type particles as a stabilizer, may be insufficient in heat resistance.

The chlorine-containing resin stabilizer according to the present invention comprises the Mg—Al-based hydrotalcite-type particles which are surface-coated with higher fatty acids, organosilane compounds, rosins or the like.

The amount of the stabilizer mixed in the chlorine-containing resin may be adjusted such that the Mg—Al-based hydrotalcite-type particles are present in an amount of usually 0.5 to 10 parts by weight, preferably 1 to 8 parts by weight based on 100 parts by weight of the chlorine-containing resin such as vinyl chloride resin. When the amount of the stabilizer mixed is less than 0.5 part by weight, the effect of improving the heat resistance of the chlorine-containing resin may not be expected. When the amount of the stabilizer mixed is more than 10 parts by weight, the effect of improving the heat resistance of the chlorine-containing resin is already saturated and, therefore, it is meaningless to add such a large amount of the stabilizer.

Next, the process for producing the Mg—Al-based hydrotalcite-type particles according to the present invention, is described.

The Mg—Al-based hydrotalcite-type core particles used in the present invention can be produced by conducting a first reaction which comprises the steps of mixing an aqueous anion-containing alkali solution, an aqueous magnesium salt solution and an aqueous aluminum salt solution with each other, and after controlling the pH value of the obtained mixed solution to 10 to 14, aging the solution at a temperature of 80 to 105° C. to produce primary particles of Mg—Al-based hydrotalcite-type core particles; and then conducting a second reaction which comprises the steps of adding an aqueous magnesium salt solution and an aqueous aluminum salt solution to the obtained aqueous suspension containing the primary particles such that the molar ratio of a sum of Mg and Al added in this step to the sum of Mg and Al previously added upon formation of the primary particles (upon the first reaction) is not more than 0.35:1; and aging the obtained mixture at a temperature of 60 to 105° C. while controlling the pH value thereof to 10 to 14.

In the present invention, as the aqueous anion-containing alkali solution, there may be suitably used a mixed aqueous alkali solution composed of an aqueous anion-containing solution and an aqueous alkali hydroxide solution.

As the aqueous anion-containing solution, the use of an aqueous sodium carbonate solution is preferred.

As the aqueous alkali hydroxide solution, the use of an aqueous sodium hydroxide solution is preferred.

In the present invention, as the aqueous magnesium salt solution, there may be usually used an aqueous magnesium sulfate solution, an aqueous magnesium chloride solution, an aqueous magnesium nitrate solution or the like. Among these aqueous magnesium salt solutions, the aqueous magnesium sulfate solution and the aqueous magnesium chloride solution are preferred.

In the present invention, as the aqueous aluminum salt solution, there may be usually used an aqueous aluminum sulfate solution, an aqueous aluminum chloride solution, an aqueous aluminum nitrate solution or the like. Among these aqueous aluminum salt solutions, the aqueous aluminum sulfate solution and the aqueous aluminum chloride solution are preferred.

In the first reaction of the above production process, the order of mixing or addition of the aqueous anion-containing alkali solution, the aqueous magnesium salt solution and the aqueous aluminum salt solution is not particularly restricted. All of the aqueous solutions may be mixed together at the same time. Preferably, a mixed solution previously prepared by mixing the aqueous magnesium salt solution and the aqueous aluminum salt solution together is added to the aqueous anion-containing alkali solution.

Further, the addition of each aqueous solution may be carried out either by adding the whole part thereof at once, or by continuously dropping the solution.

In the reaction solution prepared in the first reaction by mixing the aqueous anion-containing solution, the aqueous magnesium salt solution and the aqueous aluminum salt solution together, the concentration of the magnesium salt is usually 0.1 to 1.5 mol/liter, preferably 0.1 to 1.2 mol/liter; the concentration of the aluminum salt is usually 0.03 to 1.0 mol/liter, preferably 0.04 to 0.8 mol/liter; the concentration of the anion is usually 0.05 to 1.4 mol/liter, preferably 0.06 to 1.2 mol/liter; and the concentration of the alkali hydroxide is usually 0.5 to 8 mol/liter, preferably 0.8 to 6 mol/liter. The ratio of magnesium to aluminum added (Mg/Al) is usually 0.8 to 5.0, preferably 0.9 to 4.5.

The aging temperature of the first reaction is usually 80 to 105° C., preferably 85 to 105° C. When the aging temperature is less than 80° C., it may be difficult to produce the primary particles of the hydrotalcite-type particles having a large plate surface diameter. When the aging temperature is more than 105° C., it is necessary to use a pressure vessel such as autoclave in the aging, resulting in uneconomical process.

During the aging of the first reaction, the pH value of the reaction solution is controlled to usually 10 to 14, preferably 11 to 14. When the pH value is less than 10, it may be difficult to obtain the primary particles of the hydrotalcite-type particles having a large plate surface diameter and an adequate thickness.

The aging time in the first reaction is usually 2 to 24 hours. When the aging time is less than 2 hours, it is difficult to obtain the primary particles of the hydrotalcite-type particles having a large plate surface diameter and an adequate thickness. When the aging time is more than 24 hours, the process becomes uneconomical.

Upon completion of the first reaction, magnesium and aluminum do not remain in the reaction suspension. Thus, it is confirmed that a whole amount of magnesium and aluminum added contribute to the formation of the primary particles of the hydrotalcite-type particles. Therefore, the composition of the obtained primary particles of the hydrotalcite-type particles is considered to be the same as initially charged one.

The primary particles of the hydrotalcite-type particles obtained in the first reaction have a plate surface diameter of usually 0.1 to 0.25 $\mu$m; a thickness of usually 0.01 to 0.07 $\mu$m; and a BET specific surface area value of usually 8 to 70 m$^2$/g.

The molar ratio of a sum of magnesium and aluminum added in the second reaction to a sum of magnesium and aluminum added in the previous first reaction is usually not more than 0.35:1, preferably not more than 0.33:1. When the molar ratio is more than 0.35:1, a large amount of fine particles may be precipitated, thereby failing to obtain hydrotalcite-type core particles having a large plate surface diameter and an adequate thickness. The lower limit of the molar ratio is preferably 0.05:1.

In the second reaction, the order of mixing or addition of the aqueous magnesium salt solution and the aqueous aluminum salt solution is not particularly restricted. Both of the aqueous solutions may be added together at the same time. Preferably, a mixed solution previously prepared by mixing the aqueous magnesium salt solution and the aqueous aluminum salt solution together is added.

Further, the addition of each aqueous solution in the second reaction may be carried out by adding the whole part thereof at once, or by continuously dropping the solution.

In the reaction solution prepared in the second reaction by mixing the aqueous magnesium salt solution and the aqueous aluminum salt solution in the aqueous suspension, the concentration of the magnesium salt is usually 0.02 to 0.7 mol/liter, preferably 0.02 to 0.6 mol/liter; and the concentration of the aluminum salt is usually 0.003 to 0.5 mol/liter, preferably 0.003 to 0.4 mol/liter. The ratio of magnesium to aluminum added (Mg/Al) is usually 0.8 to 5.0, preferably 0.9 to 4.5.

The aging temperature in the second reaction is usually 60 to 105° C., preferably 65 to 105° C. When the aging temperature is less than 60° C., it may be difficult to produce the hydrotalcite-type core particles having a large plate surface diameter. When the aging temperature is more than 105° C., it is necessary to use a pressure vessel such as autoclave in the aging, resulting in uneconomical process.

During the aging of the second reaction, the pH value of the reaction solution is controlled to usually 10 to 14, preferably 11 to 14. When the pH value is less than 10, it may be difficult to obtain hydrotalcite-type core particles having a large plate surface diameter and an adequate thickness.

The aging time in the second reaction is usually 2 to 24 hours. When the aging time is less than 2 hours, it may be difficult to obtain hydrotalcite-type core particles having a large plate surface diameter and an adequate thickness. When the aging time is more than 24 hours, the process becomes uneconomical.

Upon completion of the second reaction, magnesium and aluminum do not remain in the reaction suspension. Thus, it is confirmed that a whole amount of magnesium and aluminum contribute to the formation of hydrotalcite-type core particles. Therefore, the composition of the hydrotalcite layer formed on primary particles is considered to be the same as that charged for the second reaction.

After completion of the second reaction, the obtained particles are washed with water and then dried, thereby producing Mg—Al-based hydrotalcite-type core particles.

Next, the thus obtained Mg—Al-based hydrotalcite-type core particles are surface-coated with at least one compound selected from the group consisting of higher fatty acids having 12 to 18 carbon atoms, organosilane compounds and rosins by dry surface-treatment method or wet surface-treatment method.

The dry surface-treatment for forming the coating layer may be conducted by mixing the Mg—Al-based hydrotalcite-type core particles and at least one compound selected from the group consisting of higher fatty acids, organosilane compounds and rosins with each other at a stirring speed of 5 to 5000 rpm for 1 to 60 minutes, using a Henschel mixer, a TANINAKA-type crusher, a sand mill, an edge runner, an attrition mill or the like.

The wet surface-treatment for forming the coating layer may be conducted by adding an aqueous higher fatty acid salt solution or an aqueous solution of water-soluble rosins to an aqueous suspension obtained by dispersing the Mg—Al-based hydrotalcite-type core particles in water, and then mixing and stirring the obtained mixture at a water temperature of usually 20 to 100° C.

The surface of each core particle may be coated with the higher fatty acids having 12 to 18 carbon atoms by either dry surface-treatment method or wet surface-treatment method.

In the case of the dry surface-treatment, the Mg—Al-based hydrotalcite-type core particles and then the higher fatty acids are charged into a Henschel mixer, a TANINAKA-type crusher, a sand mill, an edge runner, an attrition mill or the like, and dry-mixed with each other therein.

As the higher fatty acids having 12 to 18 carbon atoms, there may be used stearic acid, lauric acid, oleic acid or the like. Among these higher fatty acids, stearic acid and lauric acid are preferred.

Th wet surface-treatment with the higher fatty acids may be conducted by adding an aqueous higher fatty acid salt solution to an aqueous suspension obtained by dispersing the Mg—Al-based hydrotalcite-type core particles in water; mixing and stirring the obtained mixture while controlling the water temperature to usually 20 to 100° C.; and, if required, after the mixing and stirring, controlling the pH value of the obtained mixture to 4 to 8, thereby coating the surfaces of the Mg—Al-based hydrotalcite-type core particles with the higher fatty acids. The thus obtained particles are then filtered out, water-washed, dried and then pulverized.

As the higher fatty acid salts having 12 to 18 carbon atoms, there may be used sodium stearate, sodium laurate benzene-sulfonate, sodium oleate or the like. Among these higher fatty acid salts, sodium stearate and sodium laurate benzene-sulfonate are preferred.

The amount of the higher fatty acid salts or the higher fatty acids added is usually 0.2 to 20.0% by weight (calculated as C) based on the weight of the Mg—Al-based hydrotalcite-type core particles. When the amount of the higher fatty acid salts or the higher fatty acids added is less than 0.2% by weight, it may be difficult to coat the surface of each Mg—Al-based hydrotalcite-type core particle with a sufficient amount of the higher fatty acids. When the amount of the higher fatty acid salts or the higher fatty acids added is more than 20.0% by weight, the coating effect of the higher fatty acids is already saturated and, therefore, it is meaningless to add such a large amount of the higher fatty acid salts or the higher fatty acids.

The dry surface-treatment with the organosilane compounds may be conducted by charging the Mg—Al-based hydrotalcite-type core particles and then the organosilane compounds into a Henschel mixer, a TANINAKA-type crusher, a sand mill, an edge runner, an attrition mill or the like, and dry-mixing these materials With each other therein.

As the organosilane compounds, there may be used decyltrimethoxysilane, γ-aminopropyltriethoxysilane, γ-aminopropyltrimethoxysilane or the like. Among these organosilane compounds, decyltrimethoxysilane and γ-aminopropyltriethoxysilane are preferred.

The amount of the organosilane compounds added is usually 0.2 to 18.0% by weight (calculated as C) based on the weight of the Mg—Al-based hydrotalcite-type core particles. When the amount of the organosilane compounds added is less than 0.2% by weight, it may be difficult to coat the surface of each core particle with a sufficient amount of the organosilane compounds. When the amount of the organosilane compounds added is more than 18.0% by weight, the coating effect of the organosilane compounds is already saturated and, therefore, it is meaningless to add such a large amount of the organosilane compounds.

The surface of each Mg—Al-based hydrotalcite-type core particle may be coated with the rosins by either dry surface-treatment method or wet surface-treatment method. Th wet surface-treatment with the rosins may be conducted by adding an aqueous solution of water-soluble rosins to an aqueous suspension obtained by dispersing the Mg—Al-based hydrotalcite-type core particles in water; mixing and stirring the obtained mixture while controlling the water temperature to usually 20 to 100° C.; and, if required, after the mixing and stirring, controlling the pH value of the obtained mixture to 4 to 8, thereby coating the surfaces of the Mg—Al-based hydrotalcite-type core particles with the rosins. The thus obtained particles are then filtered out, water-washed, dried and then pulverized.

The dry surface-treatment with the rosins may be conducted by charging the Mg—Al-based hydrotalcite-type core particles and then the rosins into a Henschel mixer, a TANINAKA-type crusher, a sand mill, an edge runner, an attrition mill or the like, and then dry-mixing these materials with each other therein. The dry mixing may be conducted at a stirring speed of 5 to 5000 rpm for 1 to 60 minutes.

As the rosins, there may be used water-soluble rosins in the case of the wet surface-treatment, natural rosins or hydrogenated rosins in the case of the dry surface-treatment, or the like.

The amount of the rosins added is usually 0.2 to 25.0% by weight (calculated as C) based on the weight of the Mg—Al-based hydrotalcite-type core particles. When the amount of the rosins added is less than 0.2% by weight, it may be difficult to coat the surface of each Mg—Al-based hydrotalcite-type core particle with a sufficient amount of the rosins. When the amount of the rosins added is more than 25.0% by weight, the coating effect of the rosins is already saturated and, therefore, it is meaningless to add such a large amount of the rosins.

Next, the chlorine-containing resin composition according to the present invention is described.

The heat stability of the chlorine-containing resin composition is usually not less than 150 minutes, preferably 200 to 600 minutes, when measured according to JIS K6723. When the heat stability is less than 150 minutes, the chlorine-containing resin composition is unsuitable for gaskets.

The chlorine-containing resin composition according to the present invention contains the above Mg—Al-based hydrotalcite-type particles of 0.5 to 10 parts by weight based on 100 parts by weight of the chlorine-containing resin and a plasticizer of 50 to 100 parts by weight based on 100 parts of the chlorine-containing resin, and may further contain other stabilizers and additives.

Meanwhile, as the hydrotalcite-type particles, there may be used Mg—Al-based hydrotalcite-type particles surface-coated with at least one compound selected from the group consisting of hydroxides of higher fatty acids having 12 to 18 carbon atoms, organosilane compounds and rosins. Such surface-coated hydrotalcite-type particles are more improved in dispersibility in the chlorine-containing resin.

As the chlorine-containing resin, there may be exemplified polyvinyl chloride, copolymers containing vinyl chloride as a main component, chlorinated polyethylene, polyvinylidene chloride, chlorinated polypropylene, chlorinated polyvinyl chloride or mixtures thereof. Among them, polyvinyl chloride is preferred. The degree of polymerization of polyvinyl chloride is preferably 1,000 to 1,500.

When the content of the hydrotalcite-type particles is less than 0.5 parts by weight based on 100 parts of the chlorine-containing resin, the particles may not exhibit a sufficient effect as a stabilizer. When the content of the hydrotalcite-type particles is more than 10 parts by weight, no further stabilizing effect is obtained since the effect is already saturated. In addition, if a too large amount of the hydrotalcite-type particles is added, the chlorine-containing resin composition tends to undergo foaming, thereby sometimes adversely affecting an electrical insulating property and other necessary properties thereof.

As the plasticizer, trimellitic acid esters, phthalic acid esters, polyesters or the like may be exemplified.

As the trimellitic acid esters, there may be exemplified trioctyltrimertate, tri-n-octyl-n-decyltrimeritate or the like.

As the phthalic acid esters, there may be exemplified diisodecyl phthalate, diisononyl phthalate, di-2-ethylhexyl phthalate, dinonyl phthalate or the like.

As the polyesters, there may be exemplified polypropylene adipate, polypropylene sebacate or the like.

When the content of the plasticizer is less than 50 parts by weight based on 100 parts of the chlorine-containing resin, it may be difficult to obtain a resin composition having a flexibility required for gasket materials. When the content of the plasticizer is more than 100 parts by weight, no further flexibility-imparting effect is obtained since the effect is already saturated.

Examples of the other stabilizers may include zinc compounds, β-diketones, phosphites, polyvalent alcohol-based compounds, higher fatty acids, epoxy-based compounds or the like. Among these stabilizers, in the consideration of synergistic effect with the hydrotalcite-type particles, zinc compounds are preferred. The amount of the other stabilizers is preferably not more than 20 parts by weight based on 100 parts by weight of the chlorine-containing resin.

As the zinc compounds, there may be used zinc stearate, zinc laurate, zinc ricinoleate or the like. Among them, zinc stearate is preferred.

The amount of the zinc compound added is preferably 0.2 to 2.5 parts by weight, more preferably 0.5 to 2.2 parts by weight based on 100 parts by weight of the chlorine-containing resin.

As the β-diketones, there may be exemplified dibenzoyl methane, stearoyl benzoyl methane, dehydroacetic acid or the like.

As the phosphites, there may be exemplified alkylallyl phosphites, trialkyl phosphites or the like.

As the polyvalent alcohol-based compounds, there may be exemplified dipentaerythritol, pentaerythritol, glycerol, diglycerol, trimethylol propane or the like.

As the higher fatty acids, there may be exemplified stearic acid, lauric acid, oleic acid or the like. Among these higher fatty acids, stearic acid is preferred.

As the epoxy-based compounds, there may be exemplified epoxidated linseed oil, epoxidated soybean oil or the like.

Examples of the other additives may include antioxidants, pigments, gelling accelerators, extenders, flame retardants, lubricants, mildewproofing agents or the like. The amount of the other additives is preferably not more than 40 parts by weight based on 100 parts by weight of the chlorine-containing resin.

As the anitioxidants, there may be exemplified phenol-based compounds, amine-based compounds, phosphate-based compounds or the like.

As the phenol-based compounds, there may be exemplified 2,6-di-tertiary butyl-paracresol, 2,4,6-tri-tertiary butylphenol, styrenated phenol or the like.

As the amine-based compounds, there may be exemplified phenyl-β-naphthylamine, N,N'-diphenyl-p-phenylenediamine or the like.

As the phosphate-based compounds, there may be exemplified triphenyl phosphite, diphenyl decyl phosphite, phenyl isodecyl phosphite or the like.

As the pigments, there may be exemplified clay, mica, titanium oxide, carbon black, phthalocyanine, azo pigments, quinacridone pigments or the like.

As the gelling accelerators, there may be exemplified polyesters wherein OH groups are introduced into the terminal, acrylonitrile-styrene copolymers, methylmethacrylate-styrene copolymers or the like.

As the extenders, there may be exemplified calcium carbonate, silica, glass beads, mica, glass fibers or the like.

As the flame retardants, there may be exemplified inorganic flame retardants such as antimony trioxide, aluminum hydroxide or zinc borate, bromine-containing organic flame retardants, halogen-containing phosphate-based flame retardants or the like.

As the lubricants, there may be exemplified calcium stearate, magnesium stearate, barium stearate or the like.

As the mildewproofing agents, there may be exemplified 2,4,4'-trichloro-2'-hydroxydiphenyl-ether, N-(trichloromethyl-thio)-4-cyclohexel,2-dicarboxiamide, 2-(4-thiazolyl)-benzimidazol or the like.

The process for producing the chlorine-containing resin composition according to the present invention is described below.

The chlorine-containing resin composition according to the present invention can be produced by ordinary methods. For example, in the case where the resin composition is produced in the form of a kneaded sheet for gasket, the chlorine-containing resin, the hydrotalcite-type particles and the above-described various stabilizers or additives are mixed with each other at a predetermined mixing ratio, and the resultant mixture is kneaded together using hot rolls at a temperature of preferably 145 to 170° C. The kneaded material is then pressure-treated using a hot press at a temperature of preferably 150 to 190° C. to obtain a sheet.

The point of the present invention lies in that the Mg—Al-based hydrotalcite-type particles having a large plate surface diameter and an adequate thickness according to the present invention can be produced even under ordinary pressure by conducting the first reaction for obtaining the primary particles of the hydrotalcite-type core particles by coprecipitation reaction; and then conducting the second reaction comprising the steps of adding the aqueous magnesium salt solution and the aqueous aluminum salt solution to the aqueous suspension containing the hydrotalcite-type core particles, and aging the resultant mixture.

The reason why the Mg—Al-based hydrotalcite-type particles having a large plate surface diameter and an adequate thickness according to the present invention can be obtained, is considered as follows. That is, in the first reaction, there are produced primary particles of the hydrotalcite-type core particles having an appropriate particle size. Further, in the second reaction, magnesium ion and aluminum ions added are caused to coprecipitate on the surfaces of the hydrotalcite-type core particles, thereby topotactically forming a hydrotalcite layer thereon. As a result, the crystal growth of the hydrotalcite-type core particles can be further promoted.

Also, when the Mg—Al-based hydrotalcite-type particles according to the present invention are kneaded into vinyl chloride resin having the above-described composition to form a kneaded resin sheet, and the kneaded resin sheet is subjected to heat stability test, the occurrence of zinc burning can be effectively inhibited (namely, even though a large amount of zinc-containing compounds are contained in the composition, the kneaded resin sheet can be prevented from being deteriorated in heat stability and resistance to heat discoloration). The reason why the zinc burning can be effectively prevented, is not clearly known. However, as shown in FIG. 1, the vinyl chloride-kneaded sheet using the Mg—Al-based hydrotalcite-type particles according to the present invention is considerably enhanced in heat-resisting time as compared to commercially available ones.

Meanwhile, FIG. 1 shows the results of heat stability test conducted according to JIS K 6723, and represents a plotted curve of heat-resisting time versus amount of zinc stearate added, with respect to a kneaded resin sheet prepared by kneading 4 parts by weight of the hydrotalcite-type particles, 100 parts by weight of a vinyl chloride resin (degree of polymerization: 1,300) and 50 parts by weight of diethylhexyl phthalate, with zinc stearate under the same conditions as described above, when the content of zinc stearate is varied from 0 to 2.4 parts by weight. As is apparent from the test results, the heat resistance of the sheet can be further enhanced only by increasing the amount of inexpensive zinc stearate added, without using a more expensive stabilizer such as β-diketone.

The reason why the kneaded resin sheet prepared by kneading the Mg—Al-based hydrotalcite-type particles having a coating layer comprising at least one compound selected from the group consisting of higher fatty acids, organosilane compounds and rosins according to the present invention, into chlorine-containing resins, can exhibit a further enhanced heat resistance, is considered as follows. That is, the hydrotalcite-type particles according to the present invention exhibit an improved dispersibility in resins and, therefore, can be uniformly dispersed in the chlorine-containing resin. Therefore, unstable chlorine ions in the chlorine-containing resins can be effectively captured by the uniformly dispersed particles, resulting in enhanced stability and heat resistance of the resins. In addition, since the above coating layer serves for reducing a surface basicity of the Mg—Al-based hydrotalcite-type particles, the resins can be prevented from being decomposed, also resulting in enhanced stability and heat resistance of the resins.

Thus, the Mg—Al-based hydrotalcite-type particles according to the present invention have a large plate surface diameter and an adequate thickness, can improve the heat resistance of chlorine-containing resin when kneaded thereinto and are, therefore, suitable as a stabilizer for the chlorine-containing resins.

EXAMPLES

The present invention is described in more detail by Examples and Comparative Examples, but the Examples are only illustrative and, therefore, not intended to limit the scope of the present invention.

Various properties were evaluated by the following methods.

(1) The plate surface diameter of hydrotalcite-type particles and hydrotalcite-type core particles is expressed by the average of values measured from an electron micrograph.

(2) The thickness of hydrotalcite-type particles and hydrotalcite-type core particles is expressed by the value calculated from the diffraction peak curve of (003) crystal plane of the hydrotalcite-type particles according to Scherrer's formula by using an X-ray diffractometer RAD-2A (manufactured by Rigaku Denki Co., Ltd.; type of X-ray tube: Fe, tube voltage: 40 kV; tube current: 20 mA; goniometer: wide-angle goniometer, sampling width: 0.010°, scanning speed: 0.5°/min., light-emitting slit: 1°, scattering slit: 1°, light-receiving slit: 0.30 mm).

(3) The identification of hydrotalcite-type core particles is conducted by X-ray diffraction method using the above X-ray diffractometer, and the measurement is carried out at an diffraction angle (2θ) of 5 to 90°.

(4) The index x of the composition formula: $Mg_{1-x} \cdot Al_x \cdot (OH)_2 \cdot A^{n-}{}_p \cdot mH_2O$ of Mg—Al-based hydrotalcite-type core particles is determined by dissolving the particles in acid and measuring amounts of respective elements by an inductively coupled plasma atomic emission spectroscope SPS4000 (manufactured by Seiko Denshi Kogyo Co., Ltd.).

(5) The specific surface area is expressed by the value measured by BET method.

(6) The pH of the particles is expressed by the value measured by the following method. That is, 5 g of the particles as a sample were weighed and charged into a 300-ml conical flask. 100 ml of boiling pure water was added into the flask. After keeping the boiling condition for about 5 minutes while heating, the flask wag plugged and the contents thereof was allowed to stand for cooling to ordinary temperature. Water was added into the flask in an amount corresponding to the amount of water lost, and then the flask was plugged again and shaken for one minute to mix the contents thereof together. After allowing the resultant mixture to stand for 5 minutes, the pH value of the obtained supernatant liquid was measured according to JIS Z 8802-7. The thus obtained pH value was regarded as that of the particles to be measured.

(7) The carbonate ion content when using $CO_3{}^{2-}$ as the anion ($A^{n-}$), and the amounts of higher fatty acids, organosilane compounds or rosins coated on the surfaces of the particles, are evaluated by measuring the carbon content (wt. %) of the particles by a Carbon-Sulfur Analyzer EMIA-2200 (manufactured by Horiba Co., Ltd.). Specifically, the amounts of higher fatty acids, organosilane compounds or rosins coated on the surfaces of the particles, are evaluated by measuring the increase in carbon content of the surface-treated particles as compared to that before the surface-treatment.

(8) The heat-resisting time of a vinyl chloride resin containing Mg—Al-based hydrotalcite-type particles is measured according to the above-described method for heat stability test.

(9) The tinting property of the chlorine-containing resin composition is evaluated by visually observing the color tone of the above sheet. The evaluation ratings with respect to the tinting property (initial tinting property) are as follows.

A: Extremely excellent;

B: Excellent;

C: Slightly deteriorated; and

D: Deteriorated

(10) The degree of press discoloration of the chlorine-containing resin composition upon press-molding is evaluated by the following method.

Kneaded sheet materials prepared by kneading the resin composition between hot rolls heated to 160° C., were hot-pressed at 180° C. for 30 minutes and at 170° C. for 5 minutes, thereby obtaining respective sheets. The color tones of the thus obtained sheets were visually observed and compared with each other. The observation results are classified into the following four ranks.

A: Almost no difference in color tone between the sheets;

B: Slight difference in color tone therebetween;

C: Some difference in color tone therebetween (yellowish color); and

D: Remarkable difference in color tone therebetween (discolored to brown color).

(11) The degree of heat discoloration of the chlorine-containing resin composition is evaluated by the following method.

A sheet having a thickness of 1 mm was prepared by the above production method using a hot-roll temperatures of 160° C. and a hot-press temperature of 160° C. The thus obtained sheet was heated at 190° C. 120 minutes after initiation of the heating, the change in color tone of the sheet was visually observed to evaluate the degree of heat discoloration thereof. The tinting property was evaluated according to the following ratings.

A: No discoloration;

B: Almost no discoloration;

C: Slight discoloration (yellow); and

D: considerable discoloration (reddish brown or black).

(12) The appearance of the chlorine-containing resin composition is evaluated by the following method.

A kneaded sheet prepared by the above production method using a hot roll temperature of 160° C., was extruded into a tube at 155° C. The surface roughness of the thus obtained tube was visually observed and evaluated by classifying the observation results into the following four ranks.

A: Excellent gloss (no foaming);

B: Good gloss (slight foaming):

C: Poor gloss (some foaming); and

D: Remarkably deteriorated gloss (rough surface).

Example 1

Production of Mg—Al-based Hydrotalcite-type Particles 500 milliliters of an aqueous sodium carbonate solution having a $CO_3^{2-}$ ion concentration of 0.7875 mol/liter was mixed with 491.8 ml of an aqueous sodium hydroxide solution having a NaOH concentration of 18.4 mol/liter and 500 ml of water. The resultant mixed solution was stirred at 60° C. in a reactor. Thereafter, a mixed solution composed of 500 ml of an aqueous 2.7 mol/l magnesium sulfate solution and 500 ml of an aqueous 0.45 mol/l aluminum sulfate solution was added to the above mixture, thereby obtaining a solution having a total volume of 2.5 liters. The obtained solution in the reactor was aged at 95° C. for 8 hours under stirring while controlling the pH value thereof to 12.4, thereby obtaining a white precipitate. The obtained primary particles of hydrotalcite-type core particles had an average plate surface diameter of 0.25 $\mu$m, a thickness of 0.0482 $\mu$m and a specific surface area of 17.5 m$^2$/g (first reaction).

Into the thus obtained aqueous suspension containing the primary particles of hydrotalcite-type core particles was then added a mixed solution composed of 250 ml of an aqueous 1.35 mol/l magnesium sulfate solution and 250 ml of an aqueous 0.225 mol/l aluminum sulfate solution, thereby obtaining a suspension having a total volume of 3 liters. The obtained suspension in the reactor was aged at 95° C. for 6 hours under stirring while controlling the pH value thereof to 12.1, thereby obtaining a white precipitate (second reaction). The molar ratio of a sum of magnesium and aluminum added in the second reaction to that added in the first reaction was 0.25. The obtained white precipitate was filtered out, water-washed and then dried at 60° C., thereby obtaining white particles. As a result of the analysis for identification of the white particles, it was confirmed that the white particles were hydrotalcite-type core particles.

Next, 50 g of the obtained Mg—Al-based hydrotalcite-type particles and 1.5 g of stearic acid were charged into a Taninaka-type pulverizer, and stirred and pulverized therein at a stirring speed of 3,000 rpm for 5 minutes, thereby obtaining Mg—Al-based hydrotalcite-type particles surface-coated with stearic acid.

The obtained Mg—Al-based hydrotalcite-type particles had an average plate surface diameter of 0.30 $\mu$m, a thickness of 0.0600 $\mu$m and a BET specific surface area of 13.9 m$^2$/g. The coating amount of stearic acid was 3% by weight (calculated as C) based on the weight of the Mg—Al-based hydrotalcite-type core particles, and the pH value of the coated Mg—Al-based hydrotalcite-type particles was 8.28. Further, it was determined that x, p, n, m and A in the above composition formula were 0.252, 0.126, 2, 0.14 and $CO_3^{2-}$, respectively.

2 parts by weight of the thus obtained Mg—Al-based hydrotalcite-type particles were kneaded with the above-described resin composition, thereby producing a kneaded resin sheet. When subjected the obtained kneaded resin sheet to heat stability test according to JIS K 6273, it was confirmed that the heat-resisting time of the kneaded resin sheet was 220 minutes.

Production Examples 1 to 7 and Comparative Examples 1 to 6

The same procedure as defined in Example 1 was conducted except that kind and concentration of magnesium compound, kind and concentration of aluminum compound, concentration of sodium carbonate, concentration of aqueous alkali solution, aging temperature, kind of surface-treating agent, kind of dry-type mixer and mixing time were changed variously, thereby producing Mg—Al-based hydrotalcite-type particles.

Meanwhile, in Comparative Example 5, the Mg—Al-based hydrotalcite particles were produced using an autoclave. In Comparative Example 6, there were used commercially available Mg—Al-based hydrotalcite particles "ALCAMIZER-1" (tradename, produced by Kyowa Kagaku Kogyo Co., Ltd.; plate surface diameter: 0.25 $\mu$m; thickness: 0.0610 $\mu$m; plate ratio: 4.1:1; specific surface area: 9.2 m$^2$/g).

Reference Examples 1 and 2

In Reference Example 1, there were used the Mg—Al-based hydrotalcite-type particles described in Example 2 of Japanese Patent Application Laid-Open (KOKAI) No. 11-28998(1999) (plate surface diameter: 0.40 $\mu$m; thickness: 0.0605 $\mu$m; plate ratio: 6.7:1; specific surface area: 11.6 m$^2$/g), and in Reference Example 2, there were used the Mg—Al-based hydrotalcite-type particles described in Example 1 of Japanese Patent Application Laid-Open (KOKAI) No. 11-98291(1999) (plate surface diameter: 0.30 $\mu$m; thickness: 0.0510 $\mu$m; plate ratio: 5.9:1; specific surface area: 14.6 m$^2$/g).

Example 2

500 g of the Mg—Al-based hydrotalcite-type particles obtained in Production Example 1 and 15 g of stearic acid were charged into a Henschel mixer, and mixed and pulverized therein at a stirring speed of 600 rpm for 5 minutes, thereby obtaining Mg—Al-based hydrotalcite-type particles surface-coated with stearic acid.

Examples 3 to 4

The same procedure as defined in Example 2 was conducted except that amounts of the Mg—Al-based hydrotalcite-type particles and stearic acid added were varied, thereby obtaining Mg—Al-based hydrotalcite-type particles surface-coated with stearic acid.

Examples 5 to 7

The same procedure as defined in Example 2 was conducted except that kind of surface-treating agent, kind of dry-type mixer and mixing time were varied, thereby obtaining Mg—Al-based hydrotalcite-type particles surface-coated with various surface-treating agents.

Production conditions are shown in Tables 1 to 3, and various properties of the obtained Mg—Al-based hydrotalcite-type core particles and coated Mg—Al-based hydrotalcite-type particles are shown in Tables 4 and 5.

Example 8

Production of Chlorine-containing Resin Composition

After the above Mg—Al-based hydrotalcite-type particles obtained in Example 1 together with additives were mixed in a vinyl chloride resin at the following mixing ratio, 50 g of the obtained mixture was kneaded at 155° C. for 3 minutes using hot rolls whose gap was set to 0.75 mm, thereby obtaining a kneaded sheet.

Composition Kneaded:

| | |
|---|---|
| Hydrotalcite-type particles | 3 parts by weight |
| Vinyl chloride resin | 100 parts by weight |
| (Degree of polymerization: 1,300, tradename: Kanebeer S1003, produced by Kanegafuchi Kagaku Co., Ltd.) | |
| Trioctyl trimellitate (TOTM) | 80 parts by weight |
| Zinc stearate (extra pure reagent) | 0.8 part by weight |
| Dibenzoylmethane | 0.2 part by weight |
| Phenol-based antioxidant | 0.1 part by weight |
| Calcium carbonate (heavy) | 60 parts by weight |
| Gelling promoter | 2 parts by weight |

The obtained kneaded sheet was press-molded using a hot press, thereby preparing a kneaded sheet for gaskets. The conditions used for the hot press were as follows: press temperature: 170° C.; press pressure: 50 kg/cm$^2$; press time: 1 minute; press gap: 1.0 mm; amount treated: 35 g.

The thus obtained kneaded sheet had a heat stability (heat-resisting time) of 450 minutes; an initial tinting property of A rank; a press discoloration of A rank; and an extrusion appearance of A rank.

Examples 9 to 21, Comparative Examples 7 to 12

The same procedure as defined in Example 8 was conducted except that kind and amount of plasticizer, kind and amount of Mg—Al-based hydrotalcite-type particles, and kind and amount of additives were varied, thereby obtaining Mg—Al-based hydrotalcite-type particles surface-coated with various surface-treating agents.

Production of chlorine-containing resin composition, evaluation results of the obtained chlorine-containing resin are shown in Tables 6.

TABLE 1

| | Production of primary particles of Mg—Al-based hydrotalcite-type core particles (first reaction) | | | |
|---|---|---|---|---|
| Production Examples and Comparative Examples | Amount of reaction solution (liter) | Mg compound | | |
| | | Kind | Concentration (mol/liter) | |
| Production Example 1 | 2.5 | MgSO$_4$ | 0.54 | |
| Production Example 2 | 2.5 | MgSO$_4$ | 0.54 | |
| Production Example 3 | 2.5 | MgSO$_4$ | 0.54 | |
| Production Example 4 | 2.5 | MgSO$_4$ | 0.54 | |
| Production Example 5 | 2.5 | MgSO$_4$ | 0.56 | |
| Production Example 6 | 2.5 | MgSO$_4$ | 0.35 | |
| Production Example 7 | 2.5 | MgCl$_2$ | 0.54 | |
| Comparative Example 1 | 2.5 | MgSO$_4$ | 0.54 | |
| Comparative Example 2 | 2.5 | MgSO$_4$ | 0.54 | |
| Comparative Example 3 | 2.5 | MgSO$_4$ | 0.54 | |
| Comparative Example 4 | 2.5 | MgSO$_4$ | 0.54 | |
| Comparative Example 5 | 2.5 | MgSO$_4$ | 0.54 | |

| | Production of primary particles of Mg—Al-based hydrotalcite-type core particles (first reaction) | | |
|---|---|---|---|
| Production Examples and Comparative Examples | Al compound | | Concentration of Na$_2$CO$_3$ (mol/liter) |
| | Kind | Concentration (mol/liter) | |
| Production Example 1 | Al$_2$(SO$_4$)$_3$ | 0.09 | 0.1575 |
| Production Example 2 | Al$_2$(SO$_4$)$_3$ | 0.09 | 0.1575 |
| Production Example 3 | Al$_2$(SO$_4$)$_3$ | 0.09 | 0.1575 |
| Production Example 4 | Al$_2$(SO$_4$)$_3$ | 0.09 | 0.1575 |
| Production Example 5 | Al$_2$(SO$_4$)$_3$ | 0.07 | 0.1225 |
| Production Example 6 | Al$_2$(SO$_4$)$_3$ | 0.175 | 0.3056 |
| Production Example 7 | AlCl$_3$ | 0.18 | 0.1575 |
| Comparative Example 1 | Al$_2$(SO$_4$)$_3$ | 0.09 | 0.1575 |
| Comparative Example 2 | Al$_2$(SO$_4$)$_3$ | 0.09 | 0.1575 |
| Comparative Example 3 | Al$_2$(SO$_4$)$_3$ | 0.09 | 0.1575 |
| Comparative Example 4 | Al$_2$(SO$_4$)$_3$ | 0.09 | 0.1575 |
| Comparative Example 5 | Al$_2$(SO$_4$)$_3$ | 0.09 | 0.1575 |

| | Production of primary particles of Mg—Al-based hydrotalcite-type core particles (first reaction) | | | |
|---|---|---|---|---|
| Production Examples and Comparative Examples | Concentration of NaOH (mol/l) | Aging temperature (° C.) | pH value of suspension during aging (—) | Aging time (hr) |
| Production | 3.62 | 95 | 12.4 | 8 |

TABLE 1-continued

| | | | | |
|---|---|---|---|---|
| Production Example 1 | 3.12 | 80 | 11.7 | 3 |
| Production Example 2 | 3.62 | 90 | 12.7 | 12 |
| Production Example 3 | 3.62 | 95 | 12.4 | 8 |
| Production Example 4 | 3.60 | 95 | 12.3 | 20 |
| Production Example 5 | 3.64 | 95 | 12.4 | 18 |
| Production Example 6 | 3.62 | 95 | 12.3 | 8 |
| Production Example 7 | 3.62 | 95 | 12.4 | 8 |
| Comparative Example 1 | 3.62 | 50 | 12.4 | 8 |
| Comparative Example 2 | 1.72 | 95 | 8.4 | 18 |
| Comparative Example 3 | 3.62 | 95 | 12.4 | 8 |
| Comparative Example 4 | 3.62 | 95 | 12.4 | 8 |
| Comparative Example 5 | 3.62 | 150 | 12.2 | 18 |

TABLE 2

Production of Mg—Al-based hydrotalcite-type core particles (second reaction)

| Production Examples and Comparative Examples | Amount of reaction solution (liter) | Mg compound Kind | Mg compound Concentration (mol/liter) |
|---|---|---|---|
| Production Example 1 | 3.0 | $MgSO_4$ | 0.1125 |
| Production Example 2 | 3.0 | $MgSO_4$ | 0.1125 |
| Production Example 3 | 3.0 | $MgSO_4$ | 0.1575 |
| Production Example 4 | 3.0 | $MgSO_4$ | 0.100 |
| Production Example 5 | 3.0 | $MgSO_4$ | 0.120 |
| Production Example 6 | 3.0 | $MgSO_4$ | 0.075 |
| Production Example 7 | 3.0 | $MgCl_2$ | 0.375 |
| Comparative Example 1 | 3.0 | $MgSO_4$ | 0.1125 |
| Comparative Example 2 | 3.0 | $MgSO_4$ | 0.1125 |
| Comparative Example 3 | 3.0 | $MgSO_4$ | 0.1125 |
| Comparative Example 4 | 3.0 | $MgSO_4$ | 0.180 |

Production of Mg—Al-based hydrotalcite-type core particles (second reaction)

| Production Examples and Comparative Examples | Al compound Kind | Al compound Concentration (mol/liter) |
|---|---|---|
| Production Example 1 | $Al_2(SO_4)_3$ | 0.01875 |
| Production Example 2 | $Al_2(SO_4)_3$ | 0.01875 |
| Production Example 3 | $Al_2(SO_4)_3$ | 0.02625 |
| Production Example 4 | $Al_2(SO_4)_3$ | 0.025 |
| Production Example 5 | $Al_2(SO_4)_3$ | 0.015 |
| Production Example 6 | $Al_2(SO_4)_3$ | 0.0375 |
| Production Example 7 | $AlCl_3$ | 0.125 |
| Comparative Example 1 | $Al_2(SO_4)_3$ | 0.01875 |
| Comparative Example 2 | $Al_2(SO_4)_3$ | 0.01875 |
| Comparative Example 3 | $Al_2(SO_4)_3$ | 0.01875 |
| Comparative Example 4 | $Al_2(SO_4)_3$ | 0.030 |

Production of Mg—Al-based hydrotalcite-type core particles (second reaction)

| Production Examples and Comparative Examples | (Moles of Mg and Al added in first reaction)/ (moles of Mg and Al added in second reaction) (-) | Concentration of $Na_2CO_3$ (mol/liter) |
|---|---|---|
| Production Example 1 | 0.25 | 0.1575 |
| Production Example 2 | 0.25 | 0.1575 |
| Production Example 3 | 0.23 | 0.1575 |
| Production Example 4 | 0.25 | 0.1575 |
| Production Example 5 | 0.25 | 0.1225 |
| Production Example 6 | 0.25 | 0.3056 |
| Production Example 7 | 0.25 | 0.1575 |
| Comparative Example 1 | 0.25 | 0.1575 |
| Comparative Example 2 | 0.25 | 0.1575 |
| Comparative Example 3 | 0.25 | 0.1575 |
| Comparative Example 4 | 0.40 | 0.1575 |

Production of Mg—Al-based hydrotalcite-type core particles (second reaction)

| Production Examples and Comparative Examples | Concentration of NaOH (mol/l) | Aging temperature (° C.) | pH value of suspension during aging (-) | Aging time (hr) |
|---|---|---|---|---|
| Production Example 1 | 3.02 | 95 | 12.1 | 6 |
| Production Example 2 | 2.60 | 80 | 12.2 | 5 |
| Production Example 3 | 3.02 | 95 | 11.6 | 20 |
| Production Example 4 | 3.02 | 95 | 12.0 | 10 |
| Production Example 5 | 3.00 | 95 | 12.0 | 18 |
| Production Example 6 | 3.03 | 95 | 11.8 | 18 |
| Production Example 7 | 3.02 | 95 | 11.9 | 18 |
| Comparative Example 1 | 3.02 | 95 | 11.9 | 6 |
| Comparative Example 2 | 1.72 | 95 | 8.4 | 18 |
| Comparative Example 3 | 3.02 | 50 | 12.2 | 6 |
| Comparative Example 4 | 3.02 | 95 | 11.9 | 6 |

TABLE 3

| Examples | Production of Mg—Al-based hydrotalcite-type particles |
|---|---|
| | Mg—Al-based hydrotalcite-type particles used |
| Examples 2 | Mg—Al-based hydrotalcite-type particles obtained in Production Example 1 |
| Examples 3 | Mg—Al-based hydrotalcite-type particles obtained in Production Example 1 |
| Examples 4 | Mg—Al-based hydrotalcite-type particles obtained in Production Example 2 |
| Examples 5 | Mg—Al-based hydrotalcite-type particles obtained in Production Example 1 |
| Examples 6 | Mg—Al-based hydrotalcite-type particles obtained in Production Example 1 |
| Examples 7 | Mg—Al-based hydrotalcite-type particles obtained in Production Example 1 |

| | Surface-treating agent | |
|---|---|---|
| | Kind | Amount added based on hydrotalcite-type particles (wt. %) |
| Examples 2 | Stearic acid | 3.0 |
| Examples 3 | Stearic acid | 5.0 |
| Examples 4 | Stearic acid | 15.0 |
| Examples 5 | Decyltrimethoxysilane | 0.5 |
| Examples 6 | Natural rosin | 3.0 |
| Examples 7 | Stearic acid | 3.0 |
| | Decyltrimethoxysilane | 0.5 |

| | Dry-type mixer | Mixing time (min.) |
|---|---|---|
| Examples 2 | Henschel mixer | 5 |
| Examples 3 | Henschel mixer | 5 |
| Examples 4 | Henschel mixer | 5 |
| Examples 5 | TANINAKA-type crusher | 2 |
| Examples 6 | TANINAKA-type crusher | 2 |
| Examples 7 | Henschel mixer | 5 |

TABLE 4

| Production Examples and Comparative Examples | Properties of primary particles of Mg—Al-based hydrotalcite-type particles | | | |
|---|---|---|---|---|
| | Plate surface diameter (μm) | Thickness (μm) | Plate ratio (-) | Specific surface area (m²/g) |
| Production Example 1 | 0.25 | 0.0482 | 5.2 | 17.5 |
| Production Example 2 | 0.20 | 0.0305 | 6.6 | 48.8 |
| Production Example 3 | 0.35 | 0.0502 | 7.0 | 14.6 |
| Production Example 4 | 0.25 | 0.0482 | 5.2 | 17.5 |
| Production Example 5 | 0.24 | 0.0315 | 7.6 | 44.6 |
| Production Example 6 | 0.23 | 0.0295 | 7.8 | 58.8 |
| Production Example 7 | 0.25 | 0.0490 | 5.1 | 17.2 |
| Comparative Example 1 | 0.07 | 0.0125 | 5.6 | 85.5 |
| Comparative Example 2 | 0.06 | 0.0128 | 4.7 | 91.5 |
| Comparative Example 3 | 0.25 | 0.0482 | 5.2 | 17.5 |
| Comparative Example 4 | 0.25 | 0.0482 | 5.2 | 17.5 |

| Production Examples and Comparative Examples | Properties of primary particles of Mg—Al-based hydrotalcite-type particles | |
|---|---|---|
| | Crystal phase | Composition: $Mg_{1-x} \cdot Al_x \cdot (OH)_2 \cdot A^{n-}{}_p \cdot mH_2O$ x |
| Production Example 1 | Hydrotalcite-type | 0.252 |
| Production Example 2 | Hydrotalcite-type | 0.249 |
| Production Example 3 | Hydrotalcite-type | 0.253 |
| Production Example 4 | Hydrotalcite-type | 0.252 |
| Production Example 5 | Hydrotalcite-type | 0.203 |
| Production Example 6 | Hydrotalcite-type | 0.495 |
| Production Example 7 | Hydrotalcite-type | 0.251 |
| Comparative Example 1 | Hydrotalcite-type | 0.252 |
| Comparative Example 2 | Hydrotalcite-type | 0.249 |
| Comparative Example 3 | Hydrotalcite-type | 0.252 |
| Comparative Example 4 | Hydrotalcite-type | 0.252 |

| | Carbon content (wt. %) | pH value (-) |
|---|---|---|
| Production Example 1 | 2.190 | 8.55 |
| Production Example 2 | 2.166 | 9.36 |
| Production Example 3 | 2.246 | 8.85 |
| Production Example 4 | 2.190 | 8.55 |
| Production Example 5 | 2.144 | 9.28 |
| Production Example 6 | 2.008 | 8.21 |
| Production Example 7 | 2.222 | 8.47 |
| Comparative Example 1 | 2.148 | 10.30 |
| Comparative Example 2 | 2.008 | 8.36 |
| Comparative Example 3 | 2.190 | 8.55 |
| Comparative Example 4 | 2.190 | 8.55 |

TABLE 5

| Production Examples, Examples, Comparative Examples and Reference Examples | Properties of Mg—Al-base hydrotalcite-type particles | | | |
|---|---|---|---|---|
| | Plate surface diameter (μm) | Thickness (μm) | Plate ratio (-) | Specific surface area (m²/g) |
| Production Example 1 | 0.30 | 0.0600 | 5.0 | 13.9 |
| Production Example 2 | 0.20 | 0.0312 | 6.4 | 47.5 |
| Production Example 3 | 0.55 | 0.0645 | 8.5 | 10.2 |

TABLE 5-continued

| Production Examples, Examples, Comparative Examples and Reference Examples | Properties of Mg—Al-base hydrotalcite-type particles | | | |
|---|---|---|---|---|
| Production Example 4 | 0.28 | 0.0550 | 5.1 | 14.7 |
| Production Example 5 | 0.24 | 0.0333 | 7.2 | 40.1 |
| Production Example 6 | 0.23 | 0.0299 | 7.7 | 52.3 |
| Production Example 7 | 0.30 | 0.0592 | 5.1 | 14.2 |
| Example 2 | 0.30 | D.0600 | 5.0 | 14.0 |
| Example 3 | 0.30 | 0.0600 | 5.0 | 14.3 |
| Example 4 | 0.20 | 0.0312 | 6.4 | 46.3 |
| Example 5 | 0.30 | 0.0600 | 5.0 | 14.1 |
| Example 6 | 0.30 | 0.0600 | 5.0 | 14.4 |
| Example 7 | 0.30 | 0.0600 | 5.0 | 14.0 |
| Comparative Example 1 | 0.10 | 0.0185 | 5.4 | 70.8 |
| Comparative Example 2 | 0.09 | 0.0155 | 5.8 | 88.8 |
| Comparative Example 3 | 0.10 | 0.0144 | 6.9 | 89.3 |
| Comparative Example 4 | 0.08 | 0.0160 | 5.0 | 105.7 |
| Comparative Example 5 | 0.40 | 0.0616 | 6.5 | 10.6 |
| Comparative Example 6 | 0.25 | 0.0610 | 4.1 | 9.2 |
| Reference Example 1 | 0.40 | 0.0605 | 6.7 | 11.6 |
| Reference Example 2 | 0.30 | 0.0510 | 5.9 | 14.6 |

| | Crystal phase | Composition: $Mg_{1-x} \cdot (OH)_2 \cdot A^{n-}{}_p \cdot mH_2O$ (X) |
|---|---|---|
| Production Example 1 | Hydrotalcite-type | 0.252 |
| Production Example 2 | Hydrotalcite-type | 0.239 |
| Production Example 3 | Hydrotalcite-type | 0.250 |
| Production Example 4 | Hydrotalcite-type | 0.256 |
| Production Example 5 | Hydrotalcite-type | 0.204 |
| Production Example 6 | Hydrotalcite-type | 0.482 |
| Production Example 7 | Hydrotalcite-type | 0.249 |
| Example 2 | Hydrotalcite-type | 0.252 |
| Example 3 | Hydrotalcite-type | 0.252 |
| Example 4 | Hydrotalcite-type | 0.239 |
| Example 5 | Hydrotalcite-type | 0.252 |
| Example 6 | Hydrotalcite-type | 0.252 |
| Example 7 | Hydrotalcite-type | 0.252 |
| Comparative Example 1 | Hydrotalcite-type | 0.252 |
| Comparative Example 2 | Hydrotalcite-type | 0.249 |
| Comparative Example 3 | Hydrotalcite-type | 0.248 |
| Comparative Example 4 | Hydrotalcite-type | 0.247 |
| Comparative Example 5 | Hydrotalcite-type | 0.248 |
| Comparative Example 6 | Hydrotalcite-type | 0.322 |
| Reference Example 1 | Hydrotalcite-type | 0.250 |
| Reference Example 2 | Hydrotalcite-type | 0.239 |

| | Carbon content (wt. %) | Amount of carbon increased by coating with surface-treating agent (wt. %) |
|---|---|---|
| Production Example 1 | 2.190 | — |
| Production Example 2 | 2.222 | — |
| Production Example 3 | 2.249 | — |
| Production Example 4 | 2.111 | — |
| Production Example 5 | 2.159 | — |
| Production Example 6 | 2.117 | — |
| Production Example 7 | 2.208 | — |
| Example 2 | 4.408 | 2.218 |
| Example 3 | 5.743 | 3.553 |
| Example 4 | 13.772 | 11.550 |
| Example 5 | 2.259 | 0.069 |
| Example 6 | 4.567 | 2.377 |
| Example 7 | 4.473 | 2.283 |
| Comparative Example 1 | 2.148 | — |
| Comparative Example 2 | 2.008 | — |
| Comparative Example 3 | 2.140 | — |
| Comparative Example 4 | 2.123 | — |
| Comparative Example 5 | 2.155 | — |
| Comparative Example 6 | 3.520 | — |
| Reference Example 1 | 2.108 | — |
| Reference Example 2 | 2.190 | — |

| | pH value (—) | Heat-resisting time of vinyl chloride resin-kneaded sheet |
|---|---|---|
| Production Example 1 | 8.28 | 220 |
| Production Example 2 | 9.11 | 165 |
| Production Example 3 | 8.18 | 215 |
| Production Example 4 | 8.25 | 207 |
| Production Example 5 | 9.08 | 170 |
| Production Example 6 | 8.16 | 162 |
| Production Example 7 | 8.28 | 210 |
| Example 2 | 8.02 | 266 |
| Example 3 | 7.88 | 275 |
| Example 4 | 8.78 | 182 |
| Example 5 | 8.08 | 260 |
| Example 6 | 8.04 | 258 |
| Example 7 | 7.99 | 268 |
| Comparative Example 1 | 9.90 | 55 |
| Comparative Example 2 | 8.43 | 41 |
| Comparative Example 3 | 10.10 | 45 |
| Comparative Example 4 | 10.21 | 35 |
| Comparative Example 5 | 9.50 | 122 |
| Comparative Example 6 | 9.80 | 116 |
| Reference Example 1 | 9.68 | 120 |
| Reference Example 2 | 9.30 | 123 |

TABLE 6

| Examples and Comparative Examples | Composition | | |
|---|---|---|---|
| | Kind of plasticizer | Amount of plasticizer | Kind of hydrotalcite-type particles |
| Example 9 | TOTM | 80 | Example 2 |
| Example 10 | TOTM | 80 | Example 3 |
| Example 11 | TOTM | 80 | Example 5 |
| Example 12 | TOTM | 80 | Example 6 |
| Example 13 | TOTM | 80 | Example 7 |
| Example 14 | DIDP | 80 | Example 2 |
| Example 15 | DIDP | 70 | Example 3 |
| Example 16 | DIDP | 70 | Example 5 |
| Example 17 | DIDP | 70 | Example 6 |
| Example 18 | DIDP | 70 | Example 7 |
| Example 19 | Polyester-based | 80 | Example 2 |
| Example 20 | Polyester-based | 80 | Example 3 |
| Example 21 | Polyester-based | 80 | Example 5 |
| Comparative Example 7 | Polyester-based | 80 | Production Example 1 |
| Comparative Example 8 | Polyester-based | 80 | Production Example 1 |
| Comparative Example 9 | Polyester-based | 80 | Comparative Example 3 |
| Comparative Example 10 | Polyester-based | 80 | Comparative Example 3 |
| Comparative Example 11 | Polyester-based | 80 | Reference Example 1 |
| Comparative Example 12 | Polyester-based | 80 | Reference Example 1 |

TABLE 6-continued

| Examples and Comparative Examples | Amount of hydrotalcite-type particles | Kind of fatty acid zinc salt | Amount of fatty acid zinc salt |
|---|---|---|---|
| Example 9 | 3 | Zinc stearate | 2 |
| Example 10 | 3 | Zinc stearate | 2 |
| Example 11 | 2.5 | Zinc stearate | 1.5 |
| Example 12 | 2.5 | Zinc stearate | 1.5 |
| Example 13 | 2 | Zinc stearate | 1.2 |
| Example 14 | 1.5 | Zinc stearate | 1.4 |
| Example 15 | 1.5 | Zinc stearate | 1.2 |
| Example 16 | 1.5 | Zinc stearate | 1.5 |
| Example 17 | 1.5 | Zinc stearate | 0.8 |
| Example 18 | 1.5 | Zinc laurate | 1 |
| Example 19 | 2 | Zinc stearate | 1.8 |
| Example 20 | 2 | Zinc stearate | 1.5 |
| Example 21 | 2 | Zinc stearate | 1.2 |
| Comparative Example 7 | 0.3 | Zinc stearate | 0.3 |
| Comparative Example 8 | 12 | Zinc stearate | 0.5 |
| Comparative Example 9 | 2 | Zinc stearate | 2 |
| Comparative Example 10 | 2 | Zinc stearate | 0.5 |
| Comparative Example 11 | 2 | Zinc stearate | 1.15 |
| Comparative Example 12 | 2 | Zinc stearate | 0.5 |

| | Evaluation results | | |
|---|---|---|---|
| | Initial tinting property | Heat stability (min.) | Fress discoloration |
| Example 9 | A | 450 | A |
| Example 10 | A | 420 | A |
| Example 11 | A | 390 | A |
| Example 12 | A | 400 | A |
| Example 13 | A | 300 | A |
| Example 14 | A | 270 | A |
| Example 15 | A | 250 | A |
| Example 16 | A | 300 | A |
| Example 17 | B | 230 | B |
| Example 18 | A | 280 | A |
| Example 19 | A | 310 | A |
| Example 20 | A | 290 | A |
| Example 21 | A | 270 | B |
| Comparative Example 7 | A | 40 | D |
| Comparative Example 8 | D | 700 | D |
| Comparative Example 9 | C | 140 | D |
| Comparative Example 10 | D | 120 | D |
| Comparative Example 11 | B | 240 | C |
| Comparative Example 12 | B | 260 | C |

| | Evaluation results | |
|---|---|---|
| | Heat discoloration | Appearance |
| Example 9 | A | A |
| Example 10 | A | A |
| Example 11 | A | A |
| Example 12 | A | A |
| Example 13 | A | A |
| Example 14 | A | A |
| Example 15 | A | A |
| Example 16 | A | A |
| Example 17 | B | A |
| Example 18 | A | A |
| Example 19 | A | A |
| Example 20 | A | A |
| Example 21 | A | A |
| Comparative Example 7 | D | C |
| Comparative Example 8 | C | D |
| Comparative Example 9 | D | D |
| Comparative Example 10 | D | D |
| Comparative Example 11 | C | B |
| Comparative Example 12 | C | B |

What is claimed is:

1. Mg—Al-based hydrotalcite-type particles, comprising:
(a) Mg—Al-based hydrotalcite-type core particles represented by the composition formula:

$$Mg_{1-x}\cdot Al_x\cdot(OH)_2\cdot A^{n-}{}_p\cdot mH_2O$$

wherein $0.2 \leq x \leq 0.6$; $p = x/n$; A is an n-valent anion; and m is more than 0 and not more than 1, and (b) a coating layer formed on each Mg—Al-based hydrotalcite-type core particle, which comprises at least one compound selected from the group consisting of higher fatty acids, organosilane compounds and rosins; and having:
(c) a plate surface diameter of from 0.3 to less than 1.0 $\mu$m,
(d) a thickness of from 0.02 to 0.08 $\mu$m,
(e) a heat-resisting time of not less than 160 minutes when measured by the following methods (1) to (2):
(1) after the hydrotalcite-type particles together with additives are mixed in a vinyl chloride resin at the following mixing ratio, 50 g of the obtained mixture is kneaded at 155° C. for 3 minutes using hot rolls whose gap is set to 0.75 mm, thereby obtaining a kneaded sheet, Composition of Mixture:

| | |
|---|---|
| Hydrotalcite-type particles | 2 parts by weight |
| Vinyl chloride resin (degree of polymerization: 1,300, tradename: TK-1300, produced by Shin-Etsu Kagaku Kogyo Co., Ltd.) | 100 parts by weight |
| Diethylhexyl phthalate (DOP, produced by Dai-Hachi Kagaku Co., Ltd.) | 50 parts by weight |
| Zinc stearate (extra pure reagent) | 0.8 part by weight |

(2) the obtained kneaded sheet is subjected to heat stability test according to JIS K 6723 to measure the heat-resisting time.

2. Mg—Al-based hydrotalcite-type particles according to claim 1, which further have a plate ratio (plate surface diameter/thickness) of 2:1 to 15:1, a BET specific surface area value of 7 to 30 m$^2$/g and a pH value of 7.5 to 9.5.

3. Mg—Al-based hydrotalcite-type particles according to claim 1, wherein the coating amount of the higher fatty acids is 0.2 to 20.0% by weight, calculated as C, based on the weight of the Mg—Al-based hydrotalcite-type core particles; the coating amount of the organosilane compounds is 0.2 to 18.0% by weight, calculated as C, based on the weight of the Mg—Al-based hydrotalcite-type core particles; and the coating amount of the rosins is 0.2 to 25.0% by weight, calculated as C, based on the weight of the Mg—Al-based hydrotalcite-type core particles.

4. A stabilizer for chlorine-containing resins, comprising the Mg—Al-based hydrotalcite-type particles according to claim 1.

5. A process for producing the Mg—Al-based hydrotalcite-type particles according to claim 1, comprising:

mixing an aqueous anion-containing alkali solution, an aqueous magnesium salt solution and an aqueous aluminum salt solution with each other;

after controlling the pH value of the solution to 10 to 14, aging the obtained mixed solution at a temperature of 80 to 105° C. to produce primary particles of the Mg—Al-based hydrotalcite-type core particles;

adding an aqueous magnesium salt solution and an aqueous aluminum salt solution respectively containing magnesium and aluminum in such amounts that the molar ratio of a sum of Mg and Al added in this step to the sum of Mg and Al previously added upon formation of the primary particles is not more than 0.35:1, to the obtained aqueous suspension containing the primary particles;

aging the aqueous suspension at a temperature of 60 to 105° C. while controlling the pH value thereof to 10 to 14; and forming a coating layer comprising at least one compound selected from the group consisting of higher fatty acids, organosilane compounds and rosins, on the surfaces of the obtained Mg—Al-based hydrotalcite-type core particles.

6. A process according to claim 5, wherein a reaction solution obtained in the first reaction by mixing the aqueous anion-containing alkali solution, the aqueous magnesium salt solution and the aqueous aluminum salt solution with each other, has a magnesium salt concentration of 0.1 to 1.5 mol/liter, an aluminum salt concentration of 0.03 to 1.0 mol/liter, an anion concentration of 0.05 to 1.4 mol/liter and an alkali hydroxide concentration of 0.5 to 8 mol/liter.

7. A process according to claim 5, wherein the ratio of magnesium to aluminum added (Mg/Al) is 0.8:1 to 5.0:1.

8. A process according to claim 5, wherein a reaction solution obtained in the second reaction by mixing the aqueous magnesium salt solution and the aqueous aluminum salt solution in the aqueous suspension, has a magnesium salt concentration of 0.02 to 0.7 mol/liter and an aluminum salt concentration of 0.003 to 0.5 mol/liter.

9. A process according to claim 8, wherein the ratio of magnesium to aluminum added (Mg/Al) is 0.8:1 to 5.0:1.

10. A process according to claim 5, wherein the coating layer is formed by subjecting the Mg—Al-based hydrotalcite-type core particles to dry surface-treatment with at least one compound selected from the group consisting of higher fatty acids, organosilane compounds and rosins, a stirring speed of 5 to 5,000 rpm for 1 to 60 minutes.

11. A process according to claim 5, wherein the coating layer is formed by subjecting the Mg—Al-based hydrotalcite-type core particles to wet surface-treatment, said wet surface-treatment comprising the steps of adding an aqueous higher fatty acid salt solution or an aqueous solution of water-soluble rosins to an aqueous suspension obtained by dispersing the Mg—Al-based hydrotalcite-type core particles in water, and mixing and stirring the resultant mixture at a water temperature of 20 to 90° C.

* * * * *